Oct. 28, 1952    V. F. MICHAEL    2,615,912
PURIFYING SYNTHETIC OIL-SOLUBLE CARBOXYLIC ACIDS
Filed April 7, 1949
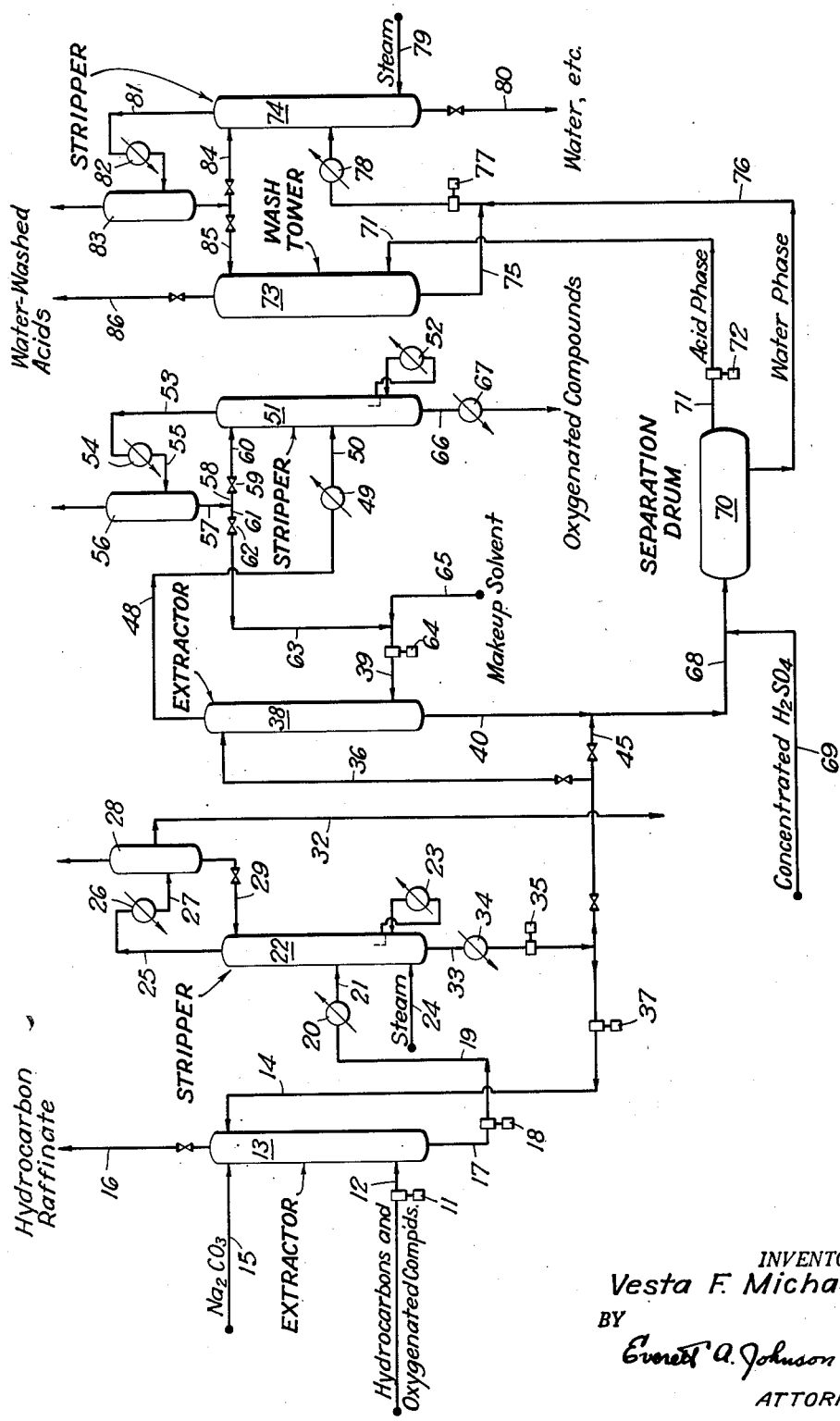
INVENTOR.
Vesta F. Michael
BY
Everett A. Johnson
ATTORNEY Patented Oct. 28, 1952

2,615,912

UNITED STATES PATENT OFFICE 2,615,912

PURIFYING SYNTHETIC OIL-SOLUBLE CARBOXYLIC ACIDS

Vesta F. Michael, Wichita, Kans., assignor to Stanolind Oil and Gas Company, Tulsa, Okla., a corporation of Delaware Application April 7, 1949, Serial No. 86,035

4 Claims. (Cl. 260—450)

This invention relates to processes of purifying aliphatic acids, and more particularly to processes for removing organic impurities from higher boiling oil-soluble aliphatic acids or mixtures thereof.

In the production of organic oxygenated compounds by such processes as the hydrogenation of carbon oxides, the direct oxidation of hydrocarbon liquids and gases, and the like processes, products of great complexity are obtained which comprise a wide variety of organic oxygenated compounds including acids, alcohols, aldehydes and ketones of a broad range of molecular weight. For example, when carbon monoxide is hydrogenated in the presence of an alkali-promoted fluidized finely divided iron catalyst at temperatures of between about 580 and 675° F. and under pressures of above 250 pounds per square inch, an aqueous phase and a liquid hydrocarbon phase are produced, both being rich in oxygenated compounds. The aqueous phase includes among other organic oxygenated compounds a recoverable proportion of aliphatic acids such as acetic acid, propionic acid and butyric acids. The hydrocarbon phase includes higher boiling acids having from 5 to about 18 carbon atoms to the molecule. Such acids include 2-methylbutyric, valeric, 3-methylvaleric, hexanoic, 2-methylhexanoic, caprylic, capric, myristic, palmitic, and stearic acids, and other aliphatic carboxylic acids.

Simple, direct fractional distillation of either the hydrocarbon phase or the aqueous phase is not feasible because of the numerous multiple component azeotropes that are known to exist among the various constituents and because of a tendency of certain of the components to react, decompose or polymerize when such a mixture is exposed to elevated temperatures for appreciable periods of time. It is desired to separate the mixture, to concentrate the acid fractions, and to purify them by removing the connate organic contaminants. Among the purposes of purifying the mixed aliphatic acids are increasing the permanganate time, decreasing the turbidity which occurs upon dilution of contaminated acid, and increasing the purity of the particular acid fractions.

In the recovery of oxygenated compounds from hydrocarbon solutions, it has been proposed to extract countercurrently a solution of oxygenated compounds in hydrocarbons produced concurrently in the hydrogenation of carbon oxides. Such extractant may be an aqueous solution of a water soluble salt of a carboxylic acid and an alkali metal. For example, the extraction may be with an aqueous solution of sodium soaps of the crude synthetic acids and sodium carbonate, and it has been found that such a soap solution removes the acids quantitatively as sodium soaps by reaction with the sodium carbonate. In addition, approximately 85% of the alcohols and 50% of the aldehydes the ketones are removed from the synthesis oil solution by the extraction.

In carrying out the extraction of the organic oxygenated compounds from the hydrocarbons by means of an aqueous solution of a salt of carboxylic acid, I may operate at a temperature from somewhat below room temperature to as high as 100° C. I prefer, however, temperatures of between about 20 and 80° C., and particularly between about 30 and 60° C. Reduced, ordinary, or elevated pressures may be used so long as the extractant solution and the charging stock remain liquid under the process conditions.

The aqueous extractant solution used in my process should have an initial concentration of at least about 30% by weight of the defined class of solubilizer salts. In order to effect the optimum extraction of organic oxygenated compounds from the charging stock, a concentration of between about 30 and 50 weight percent of such salts may be used. However, higher concentrations may be used so long as the extraction conditions of temperature and pressure are such that the extractant solution is maintained in the liquid phase.

The rich sodium soap solution from the extractor may be passed to a steam stripper in which the alcohols, aldehydes and ketones and some solutized hydrocarbons are distilled overhead. This crude chemicals stream may then be withdrawn for processing in a manner which is not a part of this invention. The bottoms from the stripper, comprising an aqueous solution of the sodium soaps of the synthesis acids, also contains a small quantity of higher boiling alcohols and carbonyls but the concentrations of these are sufficiently low to allow recycle of the soap solution to the extraction column. A stream of soap is continuously withdrawn, however, at a rate sufficient to remove the sodium soaps formed from the acids in the stream of synthesis hydrocarbons.

The net soap stream is passed through a second steam stripper or an extractor to remove the traces of alcohols and carbonyls after which it is neutralized with a mineral acid, for example concentrated sulfuric acid, which liberates the acids as a water insoluble phase giving a stream of organic acids which require further purification.

It is with respect to this latter purification that my invention relates.

The separation and purification of a mixture of aliphatic carboxylic acids containing small amounts of organic contaminants presents a difficult problem, and heretofore the contaminants have been removed only with considerable difficulty, if at all, and at prohibitive expense. The contaminants which are present in the acid mixtures have boiling points near the boiling points of the acids or form azeotropic mixtures on distillation with the acids and the separation of the uncontaminated acids is made difficult by the complex nature of the mixture in which they occur.

It is, therefore, a primary object of my invention to separate substantially pure aliphatic acids from contaminated mixtures thereof. Another object is to recover oil soluble acids of good color and color stability. A more specific object of my invention is to provide a system for recovering water soluble and water insoluble contaminants from higher boiling aliphatic acids produced concurrently with hydrocarbons by the hydrogenation of carbon oxides. Other objects and advantages of my invention will become apparent from the following description taken with the drawings which form a part thereof.

Referring to the drawing, I have illustrated an embodiment of my invention wherein a hydrocarbon stream containing alcohols, carbonyl compounds and organic acids is transferred by pump 11 through line 12 into the bottom of extractor 13 and is passed countercurrent to a downward flowing aqueous solubilizer solution containing about 30% by weight of sodium salts of a mixture of organic acids produced in the hydrogenation of carbon monoxide over an alkali-promoted finely divided iron catalyst introduced through line 14 into the top of the extractor 13. In addition to the soap solution, a quantity of sodium carbonate solution or other alkali in amount at least sufficient to react with the carboxylic acids present in the hydrocarbon stream is introduced into the top of the extractor 13. This may be introduced via a separate line 15 as illustrated or may be injected directly into line 14 containing recycled soap solution. The aqueous alkaline salt solution extracts organic oxygenated compounds from the hydrocarbon stream and the hydrocarbon raffinate from which substantially all the oxygenated compounds have been removed is withdrawn from the top of the extractor 13 and transferred through line 16 to storage or to further processing as desired.

The rich aqueous extract withdrawn from the bottom of extractor 13 through line 17 is transferred by pump 18 through line 19, heater 20 and line 21 into stripper 22, preferably at an intermediate point in stripper 22. In the stripper 22 the aqueous stream is subjected to a steam stripping operation by means of reboiler 23 and free steam introduced through line 24. Oil-soluble oxygenated compounds are stripped from the extract and together with some water vapor pass overhead from stripper 22 through line 25, cooler 26, and line 27 into the separator 28. A condensate water phase from separator 28 is refluxed to the stripper 22 through valved line 29 and the organic layer comprising oil-soluble oxygenated compounds is withdrawn through line 32 to storage and further processing.

The stripped aqueous soap stream emerging from the bottom of stripper 22 through line 33, cooler 34, and pump 35 is returned via line 14 and pump 37 to the extractor 13. A portion of the stripped soap solution, however, is diverted to acid recovery. When the water-insoluble impurities are to be removed, the stripped soap solution may be transferred via valved line 36 into the top of extractor 38. A stream of an organic solvent for high boiling oil-soluble oxygenated compounds, preferably a lower boiling hydrocarbon liquid such as pentane or a lower boiling aliphatic ether such as isopropyl ether, is introduced into the bottom of extractor 38 through line 39 and the oxygenated compounds are extracted from the aqueous stream by the solvent as the two streams pass countercurrent within the extractor 38. The extracted aqueous soap stream emerges from the bottom of extractor 38 through line 40 for regeneration and isolation of organic acids from the salts contained therein.

In some instances where it is not desired to remove the water-insoluble impurities, the treatment conducted in extractor 38 may be omitted and the stripped soap solution from line 36 diverted by valved lines 45 and 68 for regeneration and isolation of the organic acids. It is also contemplated that the stripped aqueous stream in line 36 may be split, with a portion being extracted in extractor 38 to remove oxygenated compounds and another portion being sent directly to the acid recovery steps. However, where the extractor is used, a solution of higher boiling oil-soluble oxygenated organic compounds in the solvent is removed from the top of the extractor 38 and passed through lines 48, heater 49, and line 50 at an intermediate point into stripper 51. The solvent is stripped out by heat supplied by the reboiler 52 and the solvent vapors go overhead through line 53 into condenser 54. The condensed solvent flows through line 55 into reflux drum 56 from which a portion is returned to stripper 51 through line 57, line 58, valve 59, and line 60, and the remainder is recycled to the bottom of extractor 38 through line 57, line 61, valve 62, line 63, pump 64, and line 39. Make-up solvent may be added as needed through line 65 ahead of pump 64. A stream of oil-soluble oxygenated compounds is recovered as bottoms from the stripper 51 through line 66 and cooler 67.

Reverting to the acid recovery step, the soap solution in line 68 is contacted with a stoichiometric quantity of a mineral acid, such as concentrated sulfuric acid, supplied by line 69 to liberate the organic acids from their salts. Upon treatment with the mineral acid, an oil-soluble acid phase and a liquid water phase result which are permitted to separate within separation drum 70. The upper acid phase is withdrawn from the drum 70 via line 71, and passed by pump 72 into a wash tower 73 where inorganic salts and non-distillables are removed by contacting with an acid-water phase from stripper 74. The water washings from the wash tower 73 are withdrawn from the bottom of the tower via line 75 and commingled with the water phase in line 76 from the separation drum 70. This water phase is then passed by pump 77 through heater 78 and into stripper 74 at a low point. Steam is introduced into stripper 74 by line 79 and the stripping operation is conducted so as to strip the water phase free of acidic materials other than acetic acid.

The overhead from stripper 74 is withdrawn via line 81, passed through cooler 82 and into reflux drum 83. A portion of the condensed stripper overhead may be returned by valved line 84 to the stripper 74 and another portion is introduced into wash tower 73 via line 85. Thus, the acid phase or layer from separation drum 70 is washed with an acidic water from which acetic acid has been removed as bottoms via line 80 from stripper 74. By recycling the dilute acid stream from the sodium sulfate solution stripper 74 to tower 73 via line 85, some of the emulsion difficulties which are otherwise encountered if pure water is used for scrubbing the acids in tower 73 are eliminated. However, if the water-soluble acetic acid and the contaminants associated therewith are commingled with the oil-soluble acids, they have a tendency to go off color rapidly. Accordingly, the bottoms in line 80 are not used in wash tower 73.

The water-washed oil-soluble carboxylic acids, including 2-methylbutyric, valeric, hexanoic, 2-methylhexanoic, caprylic, capric, myristic, palmitic, stearic and other aliphatic acids, are removed as a product stream via line 86. These water-washed acids may then be fractionated into narrow boiling ranges to produce a color-stable acid product.

Although I have described my invention with reference to a preferred embodiment thereof, it is to be understood that I am not limited thereto. Accordingly, it is contemplated that the apparatus, techniques and procedures available to those skilled in this art may be used in adapting and applying my invention. In general, it is intended that any modifications or equivalents of my process which might occur to one skilled in the art come within the scope of my invention.

What I claim is:

1. In a process for separating and purifying oil-soluble carboxylic acids from an aqueous mixture consisting essentially of carboxylic acid salts derived from organic acids having predominantly from 5 to 18 carbon atoms to the molecule, the steps which comprise liberating the carboxylic acids from said carboxylic acid salts, separately recovering a liquid carboxylic acid phase contaminated with water-soluble inorganic impurities and a liquid water phase containing inorganic impurities, steam stripping said liquid water phase, recovering an acidic aqueous stripper overhead product free of inorganic impurities and of acetic acid, and washing the separated liquid carboxylic acid phase with the stripper overhead product to produce a washed carboxylic acid stream substantially free of inorganic impurities.

2. The process of claim 1 wherein the carboxylic acids are liberated by treatment with sulfuric acid and the inorganic contaminant includes sodium sulfate.

3. A process for recovering from their alkali and alkaline earth metal salts mixed oil-soluble carboxylic acids having from 5 to about 18 carbon atoms to the molecule which comprises treating an aqueous solution of such salts with concentrated sulfuric acid in an amount sufficient to liberate the carboxylic acids contaminated with inorganic salts, separately recovering a liquid water phase containing some carboxylic acids and a liquid organic acid phase containing some inorganic salts, steam stripping said liquid water phase, recovering an overhead acidic water stream, introducing said liquid organic acid phase into a washing zone, supplying at least a part of said overhead acidic water stream from said steam stripping step into an upper part of said washing zone, countercurrently contacting said liquid organic acid phase and said liquid acidic water stream in said washing zone, and recovering from an upper part of said washing zone a water-washed liquid acid fraction which is free of inorganic salts.

4. In a process for separating non-acidic oxygenated organic compounds from a hydrocarbon-containing mixture comprising alcohols, aldehydes, ketones and oil-soluble carboxylic acids, wherein the non-acidic organic compounds are removed from said mixture by subjecting the mixture to extraction with an aqueous solution of mixed carboxylic acid salts derived from acids having from 5 to 18 carbon atoms to the molecule, the steps which comprise adding a sufficient quantity of alkali to said hydrocarbon-containing mixture during the said extraction step to neutralize the free carboxylic acids present therein, separating the non-acidic organic compounds from the resulting extract to produce a fraction consisting essentially of an aqueous mixture of carboxylic acid salts derived from organic acids having from 5 to 18 carbon atoms to the molecule, liberating the carboxylic acids from the carboxylic acid salts in said last-mentioned aqueous mixture, separately recovering a liquid carboxylic acid phase contaminated with water-soluble inorganic impurities and a liquid water phase containing inorganic impurities, steam stripping said liquid water phase, recovering from said stripping an acidic aqueous stripper overhead product free of inorganic impurities, and washing the separated liquid acid phase containing inorganic impurities with the stripper overhead product to produce a washed carboxylic acid mixture substantially free of inorganic impurities.

VESTA F. MICHAEL.

REFERENCES CITED

The following references are of record in the file of this patent:

UNITED STATES PATENTS

| Number | Name | Date |
|---|---|---|
| 2,258,500 | Mertens et al. | Oct. 7, 1941 |
| 2,516,126 | Lauer et al. | July 25, 1950 |
| 2,516,127 | Lauer et al. | July 25, 1950 |
| 2,535,069 | Johnson | Dec. 26, 1950 |
| 2,535,070 | Walker et al. | Dec. 26, 1950 |
| 2,535,071 | Walker | Dec. 26, 1950 |